Figures 1, 2, 3, 4:
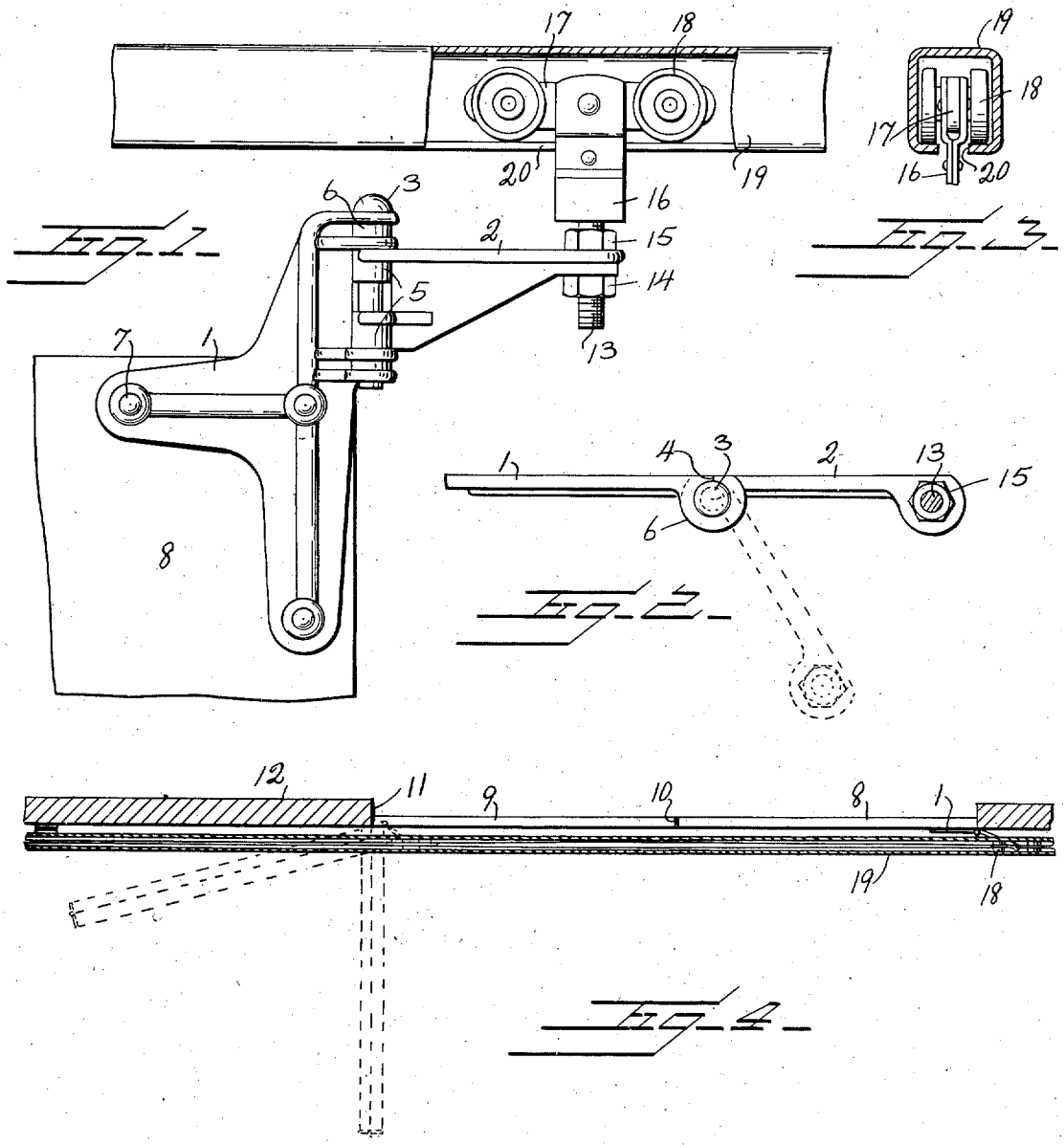

G. M. PIPER

DOOR HANGER.

APPLICATION FILED SEPT. 21, 1918.

Reissued June 22, 1920. 14,893.

Inventor
George M. Piper
By Bloomfield A. Howard
Attorney

UNITED STATES PATENT OFFICE.

GEORGE M. PIPER, OF CEDAR FALLS, IOWA, ASSIGNOR, BY MESNE ASSIGNMENTS, TO SHARON HARDWARE MANUFACTURING COMPANY, OF SHARON, PENNSYLVANIA, A CORPORATION OF PENNSYLVANIA.

DOOR-HANGER.

14,893. Specification of Reissued Letters Patent. Reissued June 22, 1920.

Original No. 1,265,952, dated May 14, 1918, Serial No. 177,962, filed June 30, 1917. Application for reissue filed September 21, 1918. Serial No. 255,167.

*To all whom it may concern:*

Be it known that I, GEORGE M. PIPER, a citizen of the United States, residing at Cedar Falls, in the county of Black Hawk and State of Iowa, have invented certain new and useful Improvements in Door-Hangers, of which the following is a specification, reference being had to the accompanying drawings.

My invention relates to improvements in door-hangers, and specifically the object of my invention is to provide a hanger between hinged doors and a carriage movable upon a track positioned thereover, which may always be operable in any positions of the doors relative to the track without coming to a dead center.

It is also an object of the invention to provide a door hanger which may be used on a track laying parallel throughout its entire length to the supporting door frame and which hanger co-acts with the inner door of a pair of pivotally connected doors, allowing said inner doors to fold back substantially parallel to each other and to the track.

These objects I have accomplished by the means which are hereinafter described and claimed, and which are illustrated in the accompanying drawings, in which Figure 1 is a front elevation of my improved door hanger as operatively connected between a carriage on a track and a door thereunder parts of the track and door being broken away; Fig. 2 is a plan of the hinge-part of said hanger; Fig. 3 is a cross-section of said track, showing said carriage therein, and Fig. 4 is a horizontal section taken through the doorway of a building, showing doors hinged to a jamb thereof and to each other and operatively connected to an overhead track by my improved hanger, dotted lines indicating different opened positions of said doors.

Similar numerals of reference denote corresponding parts throughout the several views.

Referring first to Figs. 1 to 3, the numeral 19 denotes a tubular track supported on a building 12 above its door-opening and doors 8—9. The bottom of the track has a longitudinal slot 20, providing a pair of parallel runways upon which may roll a carriage having rollers 18 pivotally mounted on a body 17, said body having a hanger 16 with depending threaded stem 13.

The inner door 9 is hinged at 11 to one jamb of the doorway, while the outer door 8 is hinged to the door 9 on hinges 10.

A hinge or link formed of the parts 1 and 2, having alined sockets 5 and 6, whereby they are pivotally connected on a pintle 3, has its part 1 secured to an upper corner of the outer door by means of bolts 7. The parts 1 and 2 have a prop- or rule-joint 4, which thus limits the relative movements of these parts so that they cannot swing to or beyond a dead-center with said doors. The part 2 has a vertical orifice near its free end to permit it to be mounted to rock on the stem 13, and is secured thereon for vertical adjustment by means of nuts 14 and 15 engaging its under and upper surfaces.

The track 19, is, in Fig. 4, shown as supported on the building 12 set off from the doors 8—9 when the latter are closed, for the purpose of a diagrammatic illustration, the usual position of said track being immediately above and in the plane of the doors when the doors are so hinged to the building as to underlie the track.

When the doors underlie the track, the hinge parts 1—2 are fully extended as shown in Fig. 2. In Fig. 4, the dotted lines display one position of said doors 8—9 when folded together so as to extend outwardly at a right angle to the building, in which position the parts are flexed at less than a right-angle. The second dotted line position shown, indicates the position of said folded doors when swung toward the building.

If the track were immediately above said doors, the parts 1—2 would be in the full line positions shown in Fig. 2, with the doors positioned closely parallel to the building, but the parts prevented by its prop-joint from passing to or beyond a dead-center. However, it will be obvious that when the track is spaced away from said doors as shown, the parts will not arrive at their stopped positions.

This arrangement of the doors, their relations to each other, to the building and said track as connected to the latter by said prop-joint hinged movable door-hanger, permits the doors to be freely swung to any position outwardly, and be as freely returned to a closed position, without any binding, or interference with their operation due to the hanger parts passing relatively to or beyond a position of dead center. The doors are thus supported from sagging, freely movable, and easily actuated, from a closed to an entirely opened position, and the reverse.

It should also be noted, that the use of my improved door-hanger and hinge or link permits the doors to be positioned either in a vertical plane passing through said track, or beyond said plane as illustrated, whereby in mounting the parts on a building the said parts are easily adjusted so as to always operate as described, whereby much inconvenience is avoided.

Having described my invention, what I claim as new, and desire to secure by Letters Patent, is:

1. The arrangement of doors hinged to each other and to a jamb of a doorway, with a swiveled, rule-joint hinge-connection of the outermost door to a carriage on an overhead track, whereby the doors can be swung to any open position without shifting the parts of said hinge-connection to or beyond a dead center, and whereby the doors may be located in or beyond the plane of the track.

2. In a door structure, the combination of a straight track rigidly mounted parallel to the door opening, a plurality of hingedly connected doors the outer one of which is hinged at one side of said door opening, a hanger mounted to travel on said track, and means connecting said hanger with the inner door allowing it to move laterally of the track in a manner permitting said doors to fold back substantially parallel to each other and to said track.

3. In a door structure, the combination of a straight track rigidly mounted parallel to the door opening, a plurality of hingedly connected doors the outer one of which is hinged at one side of said door opening, a hanger mounted to travel on said track, and a horizontally swinging member extending between said door hanger and the inner door and pivotally connected to both in manner permitting said doors to fold back substantially parallel to each other and to said track.

4. In a door structure, the combination of a suitable support; a plurality of hingedly connected doors, the outer one of which is hinged to said support; a track fixed with relation to said support and parallel therewith throughout its entire length; a hanger movable upon said track, and a link connecting said hanger and the inner door, said link having a limited rotative movement above the door and below the hanger.

5. In a door structure, the combination of a suitable support, a plurality of hingedly connected doors, the outer one of which is hinged to said support, a track fixed with relation to said support, a hanger movable upon said track, and an articulated member connecting said hanger and the inner door.

In testimony whereof I hereunto affix my signature in the presence of two witnesses.

GEORGE M. PIPER.

Witnesses:
M. G. Corrigan,
Roland F. Werner.